United States Patent
Sahasrabudhe et al.

(10) Patent No.: US 9,886,168 B2
(45) Date of Patent: Feb. 6, 2018

(54) METHOD AND SYSTEM FOR SCENARIO-DRIVEN STANDARD-COMPLIANT USER INTERFACE DESIGN AND DEVELOPMENT FOR EFFORT ESTIMATION

(71) Applicant: Infosys Limited, Bangalore (IN)

(72) Inventors: Shrirang Prakash Sahasrabudhe, Pune (IN); Ajay Kolhatkar, Pune (IN)

(73) Assignee: Infosys Limited, Bangalore (IN)

( * ) Notice: Subject to any disclaimer, the term of this patent is extended or adjusted under 35 U.S.C. 154(b) by 796 days.

(21) Appl. No.: 14/219,937

(22) Filed: Mar. 19, 2014

(65) Prior Publication Data
US 2014/0380238 A1    Dec. 25, 2014

(30) Foreign Application Priority Data
Jun. 24, 2013 (IN) .......................... 2725/CHE/2013

(51) Int. Cl.
*G06F 3/048* (2013.01)
*G06F 3/0482* (2013.01)
*G06F 9/44* (2006.01)

(52) U.S. Cl.
CPC .......... *G06F 3/0482* (2013.01); *G06F 9/4443* (2013.01)

(58) Field of Classification Search
CPC ............................ G06F 3/0482; G06F 9/4443
USPC ........................................................ 715/810
See application file for complete search history.

(56) References Cited

U.S. PATENT DOCUMENTS

| | | | | |
|---|---|---|---|---|
| 6,330,575 | B1* | 12/2001 | Moore | G06Q 30/0603 707/E17.116 |
| 6,714,963 | B1* | 3/2004 | Levine | G06Q 10/00 709/203 |
| 7,080,351 | B1* | 7/2006 | Kirkpatrick | G06Q 10/06 717/102 |
| 2003/0018952 | A1* | 1/2003 | Roetzheim | G06F 8/20 717/101 |
| 2004/0010772 | A1* | 1/2004 | McKenna | G06Q 10/06 717/101 |
| 2004/0117759 | A1* | 6/2004 | Rippert, Jr. | G06F 8/20 717/100 |
| 2004/0268228 | A1* | 12/2004 | Croney | G06F 17/3089 715/255 |

(Continued)

FOREIGN PATENT DOCUMENTS

| | | | | | |
|---|---|---|---|---|---|
| JP | 2002197315 | A | * | 7/2002 | G06F 17/60 |
| KR | 20120045152 | A | * | 5/2012 | G06Q 50/00 |

*Primary Examiner* — William Bashore
*Assistant Examiner* — Gregory A Distefano
(74) *Attorney, Agent, or Firm* — Klarquist Sparkman, LLP

(57) ABSTRACT

Embodiments of the present invention provide a method and system for scenario-based conceptualization and visualization of web-based user interface for effort estimation. The method includes providing user-selectable scenarios on said web-based user interface. A plurality of web components is provided on pre-populated screen to display existing number of screens, further user can modify the screen by adding new functionality based on business requirement. After modification, a workflow is stored in a repository for proposing it as pre-populated screen to new users. An effort is estimated by an effort estimation processor based on said modified user-selectable scenarios and compliance standard, and a report is generated for each stage of the development cycle.

18 Claims, 9 Drawing Sheets

(56) References Cited

U.S. PATENT DOCUMENTS

2008/0209446 A1    8/2008   Grechanik et al.
2010/0077329 A1    3/2010   Korn
2011/0167357 A1*  7/2011   Benjamin ........... H04L 12/1818
                                                  715/753

* cited by examiner

METHOD AND SYSTEM FOR SCENARIO-DRIVEN STANDARD-COMPLIANT USER INTERFACE DESIGN AND DEVELOPMENT FOR EFFORT ESTIMATION

FIELD

The field relates generally to application design and development. In particular, the invention relates to scenario-driven standard-compliant user interface design and development for effort estimation.

BACKGROUND

Whenever individuals (client interfacing individuals, project managers, developers etc.) are involved in a development project for accessibility implementation or developing a website, it is necessary to estimate the effort and time required to build the script and the primary input for the projects, project management, etc., based on which individuals have to decide on the number of resources required for the project. Hence the right estimation is very important for project verification. The major problem individual's face is that they do not have the user interface screen fully developed in the beginning during discussions with the client. Initially, customers are just providing only the functionalities that they are looking for in the application to be developed; later, individuals provide the prototype of the application to be developed. At this moment, the estimation is done based on assumptions that may cause the entire estimation to go wrong.

Presently, estimates for accessibility design, development and testing projects that need application screens as a primary input are based on ballpark approximations or rough assessments of the scope of work. Such estimates are usually prepared in consultation with solution experts, who rely on their past experience with similar solutions or technical experts, who assume certain function points of operations or by extrapolation of past experiences of the designer/developer. Such estimates, in most cases, either fall short of the final efforts spent, or are so over-estimated that they render the project expensive and therefore uncompetitive.

Moreover, since project requirements keep changing, even the best laid plans are insufficient and lead to cost over-runs and delays, which often result in loss of credibility as well as profitability. The limitation of the present estimation methods is the lack of the sound basis of visualization of the target system being built in the estimation of efforts, which leads to cost over-runs and delays in project completion. Reliance on past experience inhibits the possibilities for undertaking completely new projects without any precedence. Lack of availability of solution/technical expertise at the right time further makes the matter worse.

Most existing methods rely either on expertise of subject matter experts (UI designers, information architects, project managers, or testing managers), or the available templates within a UI design system and creation of mock user interfaces for effort estimation. In addition they are also dependent on the client's requirements as verbalized by a business analyst.

Accordingly, there is a need for a method and system for scenario-driven conceptualization and visualization of standard-compliant user interface to estimate the effort in proposal during early stage of the project when the screen design for the software application is not yet finalized.

SUMMARY

Embodiments include a method and system for scenario-based design and development of standard-compliant user interface for effort estimation. The method includes providing user-selectable scenarios on said web-based user interface based on requirements. A plurality of web components is provided on a pre-populated screen to display an existing number of screens on a user interface, further a user can modify the screen by adding new functionality based on business requirements. A workflow is stored in a repository for proposing it as a pre-populated screen to new users. An effort is estimated by an effort estimation processor based on said modified user-selectable scenarios and compliance standard, and a report is generated for each stage of the development cycle.

A system according to an embodiment comprises a user interface with user-selectable scenarios or web components. A pre-populated screen on said user interface can be modified based on user-selectable web components and accessibility standards. A repository is provided for storing workflow for proposing pre-populated screen to new users. The system includes an estimation processor for calculating an effort and generating reports based on user-selectable scenarios and compliance standard for different stages of development cycle.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

Figure 1:
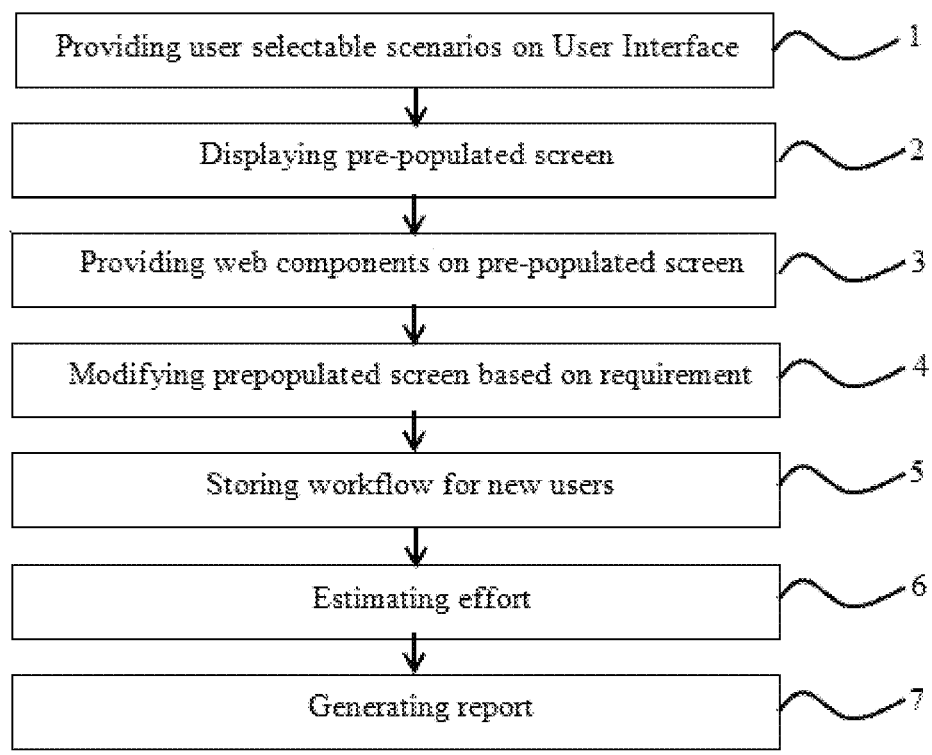
FIG. 1 shows a flowchart illustrating a method for scenario-based design and development of standard-compliant user interface, according to an embodiment.

FIG. 1 shows a flowchart illustrating a scenario-based design and development of web-based user interface for effort estimation. The method includes providing user-selectable scenarios on said web-based user interface based on requirements (1). A plurality of web components (3) is provided on a pre-populated screen (2) to display existing number of screens on user interface, further a user can modify the screen by adding new functionality based on business requirements (4). A workflow is stored in a repository for proposing it as pre-populated screen to new users (5). An effort is estimated by an effort estimation processor based on said modified user-selectable scenarios and compliance standard (6), and report is generated for each stage of development cycle (7).

Figure 9:
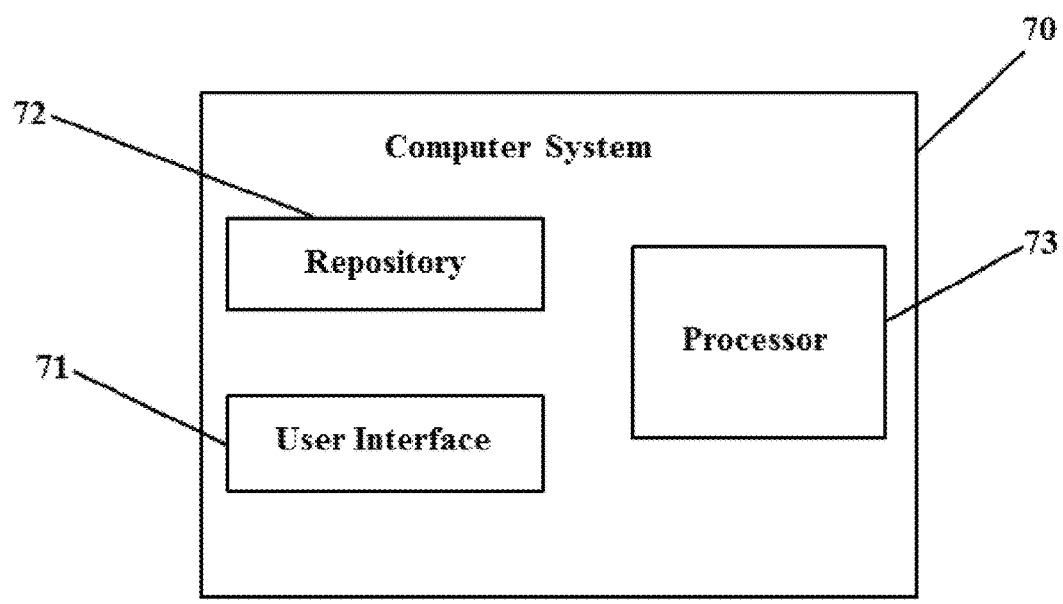
FIG. 9 shows a block diagram of a system for scenario-based design and development of standard-compliant of user interface, according to an embodiment.

A computer system 70 (as shown in FIG. 9) according to an embodiment of the present invention comprises a user interface 10 with user-selectable scenarios or web components. A pre-populated screen on said user interface can be modified based on user-selectable web components and accessibility standards. A repository 72 is provided for storing workflow for proposing pre-populated screen to new users. The system includes an estimation processor 73 for calculating an effort and generating reports based on user-selectable scenarios and compliance standard for different stages of development cycle.

The scenario-based web-based user interface 10 is created by defining estimation parameters 21 and domain repository setup 22 on create repository screen 20 of said prepopulated screen. The estimation parameters 21 can be defined by selecting different stages 21a (requirements, design, coding, testing, deployment etc.) for estimation and accessibility guidelines 21b.

Accessibility guidelines 21a include WCAG 1.0 or WCAG 2.0 as well as country-specific regulations including American Disability Act (ADA) and Section 508 of the US, Disability Discrimination Act of Australia (DDA-Aus), Disability Discrimination Act of UK (DDA-UK) and several EU regulations. The domain repository 22 can be setup by selecting the business domain 22a (e.g. banking, retail, telecom, pharmacy etc.) and various business scenarios 22b (e.g. retail banking, corporate banking, universal banking, financial marketing, wealth management etc.) based on the user requirement.

According to an embodiment, a user can log in to any particular screen and add functionality to change the screen, and this workflow will be added or stored in repository 72 for displaying as a prepopulated screen for new users. The reports 60 include generating summary report 61, screen wise report 62 and guideline wise report 63.

An embodiment provides a scenario-driven design and development of standard-compliant user interface 10 for effort estimation. Accordingly, a user can select functionality on a database based on the user's requirement. Once a user selects the functionality, the UI screen displays a number of pages or screens and these screens will be used by the user. The user has the facility to choose either the existing screen or the user can modify the screen. If the user wants to add new functionality to the screen or wants some more text boxes, the user can add, and that particular screen will be considered for that particular project. Consider for example on the banking website once user login, the UI screen provides users with many selectors related to banking domain, once the user selects the selector, the database will switch all the use cases related to banking. All the functionalities available on banking website are populated in to the database.

The database can be on the server or on any machine or remote server. Database fetches the related use cases depending on the business flow. Initially, a user has to log in using username and password, then the database or UI screen displays all the subpages, then the user has to select and finalize the screen on those pages. Once the functionalities are frozen, user can select next functionality. Consider for example, if the user selects e-transfer component, then UI will display all the pages related to e-transfer, then the user can modify or accept as it is, in this way prototype of the screen is created.

Whenever a user creates a model out of this application, that model is sent as an input to the effort estimation system. Once the user specifies all the parameters based on the requirement, effort estimation system calculates the effort. Based on use cases selected by the user, the screen will be displayed and again if the user changes use case, the changes will be stored in database. All the required web components will be embedded in the prepopulated UI screen, so that users can select, drag and drop based on the requirement. The embodiment of the invention allows a user to store the work flow such that is can be offered as a new prepopulated screen for other users. Once the user makes the changes in the UI screen that will also be shown to the new user, so that this user can learn about the UI pattern, and present UI screen is also considered as a use case for the next user.

The repository can be a database, on a machine or on a remote server etc. Once the UI screen is visualized, the effort estimator receives user inputs on the screen and the complaint standard details to calculate the effort. The estimate is calculated for entire project life cycle right from design to testing, and not for any particular stage of the project.

FIGS. 2 to 8 illustrates a scenario-based design and development of standard-compliant user interface for effort estimation, according to embodiment of the present invention. Initially user has to login using username and password, then the database or UI screen displays all the subpages or tabs, then user has to select and finalize the screen on those pages. Once the functionalities are frozen, user can select next functionality, then user can modify or accept as it is, in this way prototype of the screen is created, which will be given as an input for effort estimation.

Figure 2:
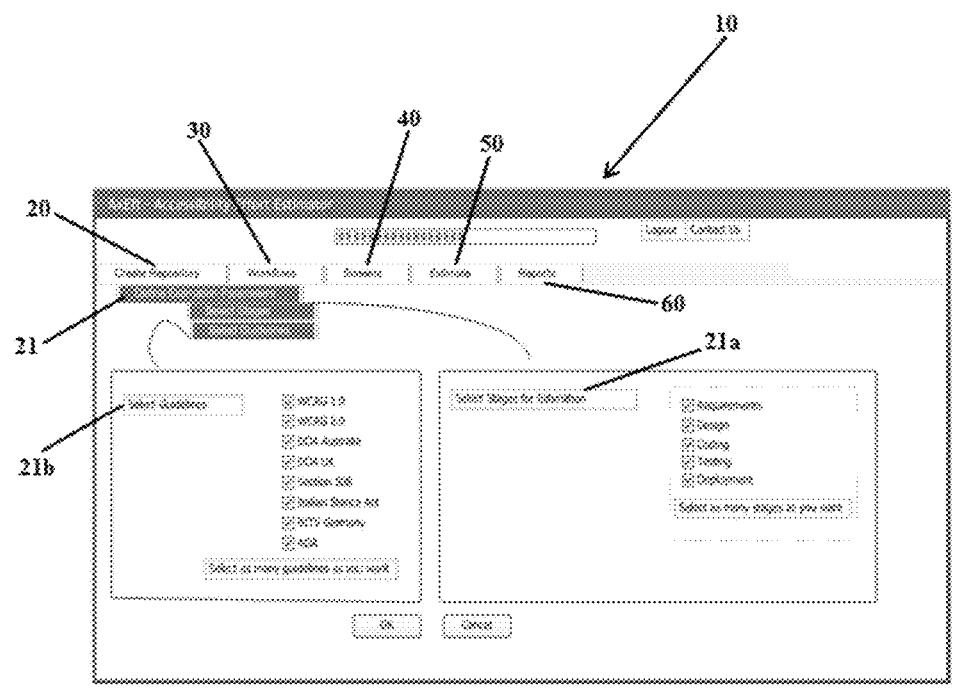
FIGS. 2 to 8 illustrate a user interface screen with selectable web components for scenario-based design and development of a standard-compliant user interface, according to an embodiment.

FIG. 2 illustrates a user interface screen 10 with web components create repository 20, workflows 30, screens 40, estimate 50 and reports 60. By selecting the create repository tab 20 user is displayed with standard template or UI for effort estimation. In order to create scenario-based UI, user can define estimation parameters 21 and can setup domain repository 22. Estimation parameters 21 can be defined by selecting stages for estimation 21a and by selecting guidelines. The different stages of estimation are requirements, design, coding, testing, deployment etc. and guidelines are WCAG 1.0, WCAG2.0, DDA Australia, DDA UK, section 508, Italian stanca Act, BITV Germany, ADA etc.

Figure 3:
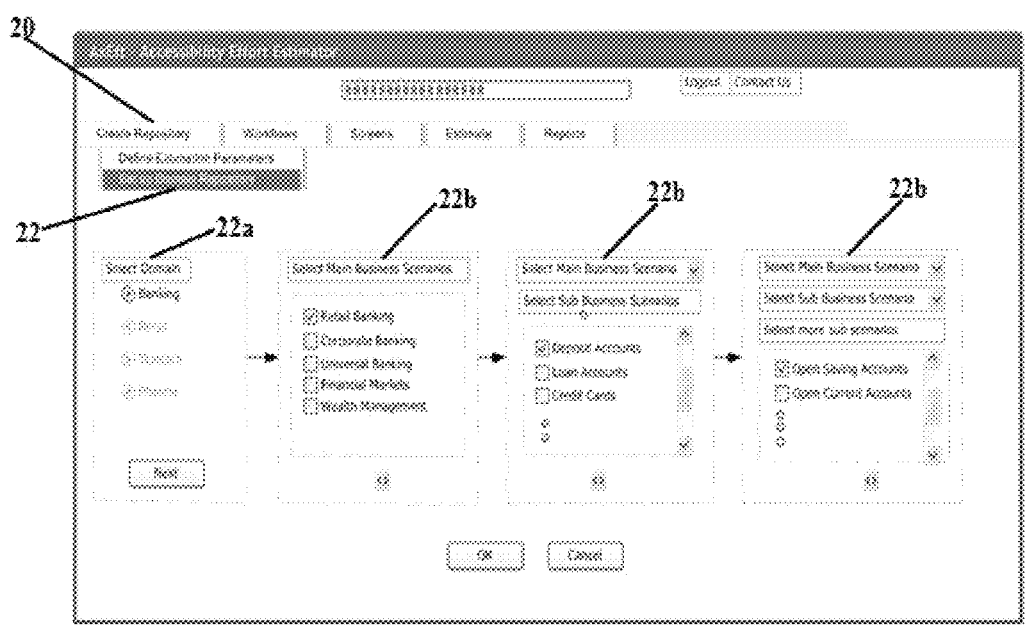

FIG. 3 shows a domain repository screen 22, according to embodiment of present invention. The domain repository 22 can be setup by selecting the business domain 22a and various business scenarios 22b based on the user requirement. Business domain 22a may be banking, retail, telecom, pharmaceutical etc. and business scenarios may be retail banking, corporate banking, universal banking, financial marketing, wealth management etc. User can select domain, function, cases according to function, and can also modify it based on the requirement. When the user is done with selection of all the use cases he will be shown with the screen where he has to select multiple guidelines using checkboxes, and then can create estimates. The modified screen will be updated in the system and it will be directly accepted by effort estimator. Once the UI screen is created using all the web components, the effort can be estimated for different UI design. The effort estimator calculates how much effort or time is required at different stages of the project and will be displayed on the UI screen.

Figure 4:
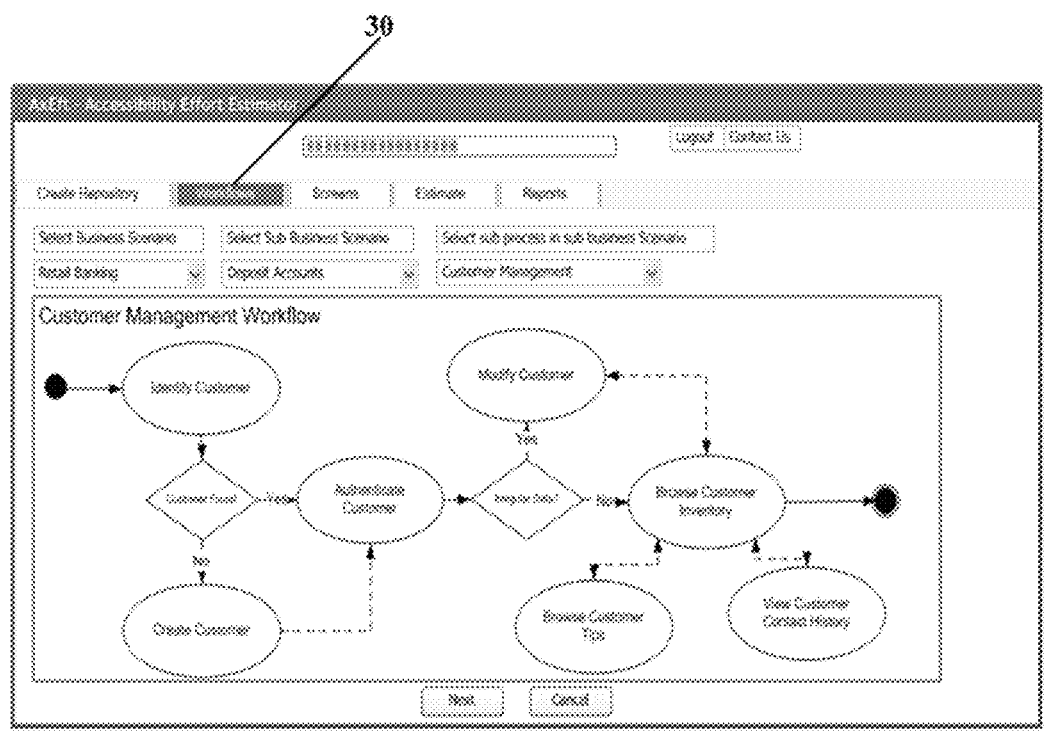
Figure 5:
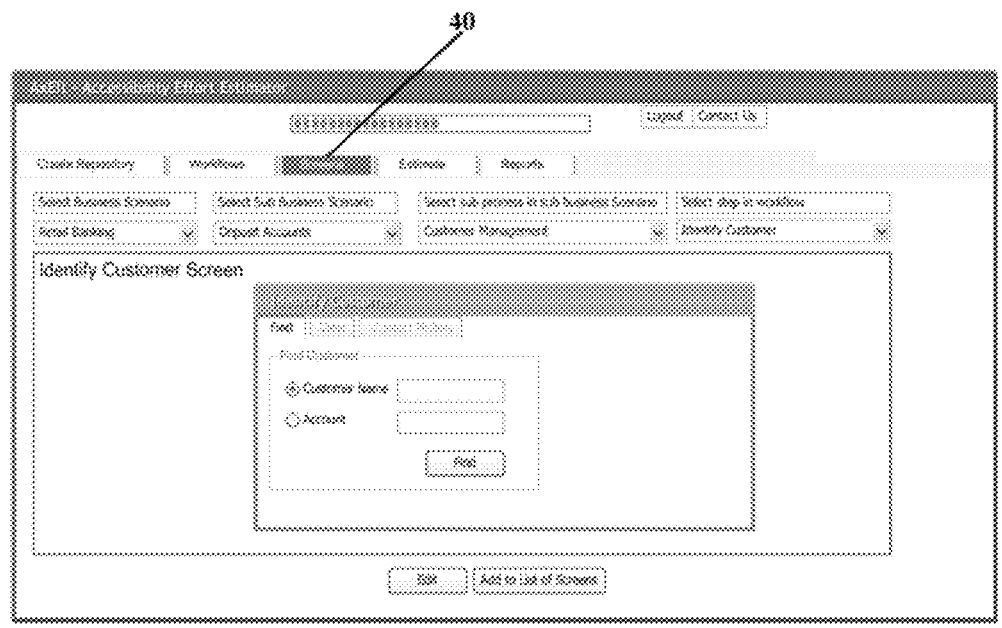
Figure 6:
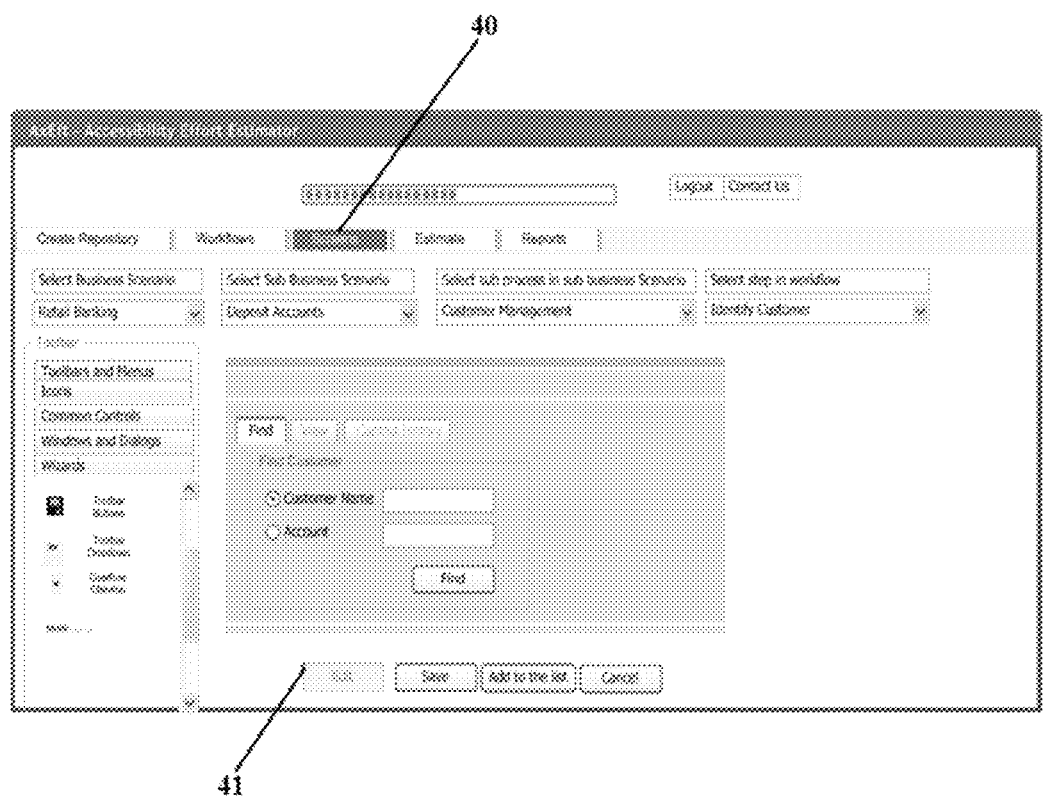

FIG. 4 shows a workflow screen 30, according to embodiment of the present invention. It allows a user to store the work flow such that is can be offered as a new prepopulated screen for other users. The actual repository will already be existing; users can add work flow at particular screen which is already created. Once a user makes the changes in the UI screen, that will also be shown to the next user, so that the user can learn about the UI pattern, and present UI screen is also considered as a use case for the next user. FIGS. 5 & 6 show screens according to embodiment of the present invention. A user can select functionality on a database based on his requirement. Once user selects the functionality the UI screen displays a number of pages or screens and these screens will be used by the user. A user has the facility to choose either the existing screen or the user can modify the screen. If a user wants to add new functionality to the screen or wants some more text boxes, the user can add and that particular screen will be considered for that particular project.

Figure 7:
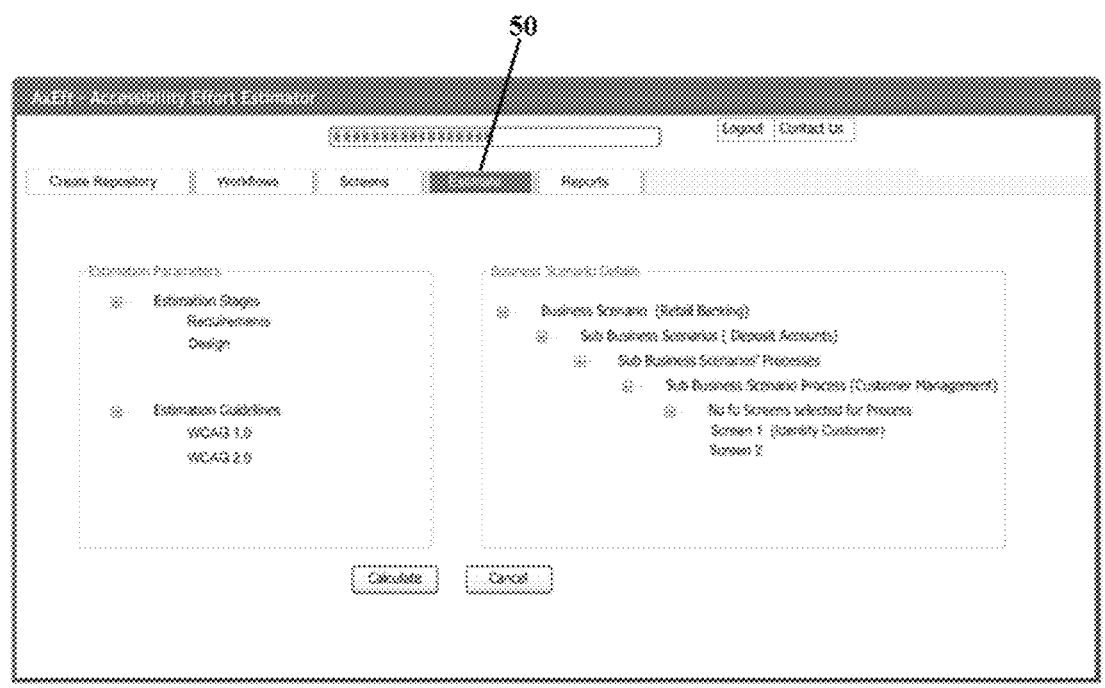
Figure 8:
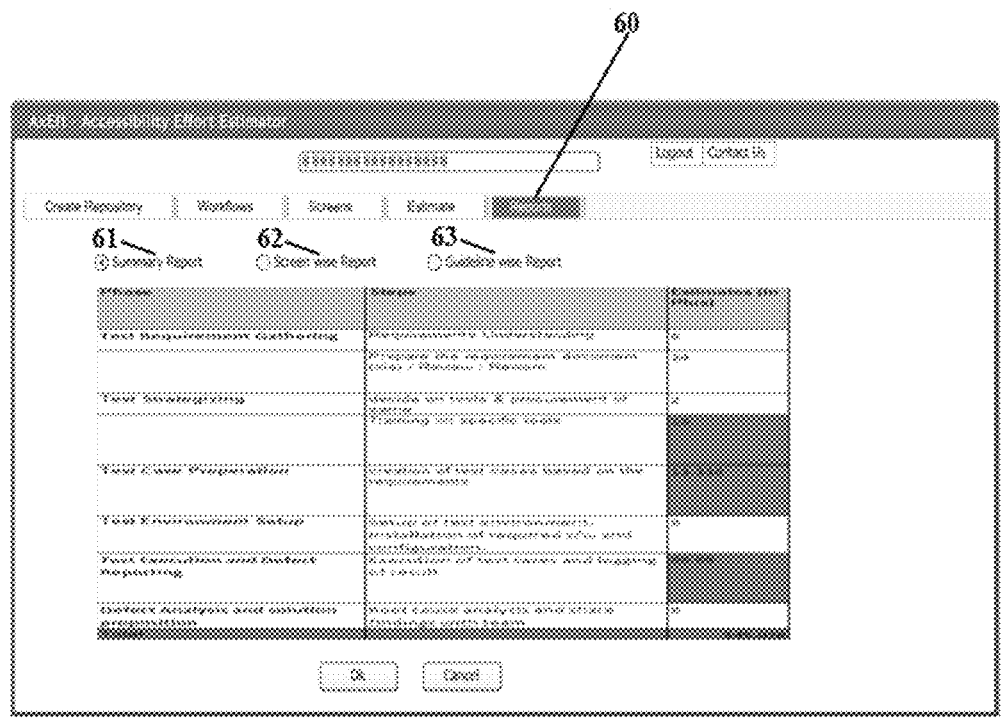

FIG. 7 shows an estimation screen according to embodiment of the present invention. Once the UI screen is designed, the input is applied to the effort estimator. The effort estimator receives user inputs on the screen and the complaint standard details to calculate the effort. The estimate is calculated for entire project life cycle right from design to testing, and not for any particular stage of the project. FIG. 8 shows the reports screen, where user can generate various reports such as summary report, screen wise report and guideline wise report.

Thus, the disclosed method and system allows designers to conceptualize and visualize the user interface, without resorting to expensive and time consuming wireframe models as well as other visualization methods. Another unique proposition, from a development perspective, is the ability of this system to deliver effort estimates that are more realistic. This is possible since it incorporates reference components commonly used in applications development, for which efforts are more easily predictable from past experiences. It helps in estimating effort for accessible development without the involvement of accessibility experts during the estimation process. It provides application users such as pre-sales person, effort estimation specialist, designer, developer, project manager, testing manager etc. a set of selectable scenarios such as registration, login, search, product customization, personalization of interface, shopping cart, shipping, loyalty rewards etc. These scenarios allow the user to not only configure the UI screens themselves, but also modify and enhance this configuration with the help of a pre-populated list of components.

The list of web components encompasses: page layouts which include left and right navigations, banner spaces, headers; list boxes, checkboxes, edit boxes; radio buttons, push buttons; various types of menus; forms, weblinks, embedded objects such audio and video; authentication, widgets such as calculators, reviews, ratings, social media, social referencing, data feeds; notifications such as email, SMS and other components commonly found in any UI.

The application users do not need to have any specific skills in the area of usability design or web design as well as in accessibility, since they will be provided with appropriate cues to consider the above mentioned components that are must have for a typical scenario which the user is putting together for the purpose of effort estimation.

It should be noted that while the user is trying to put together a scenario as mentioned above he does not mandatorily need to consult accessibility or usability experts, development managers, designers or financial coordinators for estimating efforts and costing them.

Since the application user can select from a wide variety of scenarios and further modify it, the UI design maps the end user requirements more closely and therefore is more easily accepted. This reduces the incidents of frequent changes in the UI, which leads to complications both in the design as well as in the development effort. The system and program also includes design best practices of usability as well as accessibility gathered from an analysis of multitude of websites across industry.

One or more computer-readable media (e.g., storage media) or one or more processor-readable media (e.g., storage media) can comprise computer-executable instructions causing a computing system (e.g., comprising one or more processors coupled to memory) (e.g., computer system 70 or the like) to perform any of the methods described herein. Examples of such computer-readable or processor-readable media include magnetic media, optical media, and memory (e.g., volatile or non-volatile memory, including solid state drives or the like).

The description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

What is claimed is:

1. A method for scenario-based design and development of a web-based user interface for effort estimation, the method comprising:
   receiving an indication of one or more accessibility guidelines;
   providing user-selectable scenarios for said web-based user interface based on requirements;
   exhibiting a work flow on a pre-populated work flow screen based on selected scenarios for said web-based user interface;
   providing a plurality of user-selectable web components;
   receiving an addition to the work flow of the pre-populated work flow screen;
   modifying the work flow based on the user-selectable web components;
   storing the work flow in a repository for proposing the pre-populated work flow screen with the addition to the work flow for new users;
   via an estimation process, calculating estimated effort by an effort estimation processor based on said modified work flow of the selected user-selectable scenarios, the addition to the work flow, and the accessibility guidelines;

generating reports for each stage of development cycle;

for a next user, displaying the pre-populated work flow screen with the addition to the work flow; and repeating the estimation process for the next user using the pre-populated work flow screen with the addition to the work flow.

2. The method according to claim 1, wherein a scenario-based user interface for receiving user input is created by defining estimation parameters and domain repository setup on a create repository screen.

3. The method according to claim 2, wherein said estimation parameters can be defined by selecting different stages for estimation and the accessibility guidelines.

4. The method according to claim 3, wherein said stages of estimation include requirements, design, coding, testing and deployment.

5. The method according to claim 3, wherein said accessibility guidelines include WCAG 1.0 or WCAG 2.0.

6. The method according to claim 2, wherein said domain repository can be setup by selecting a business domain and various business scenarios based on user requirement.

7. The method according to claim 6, wherein said business domain is selected from the group consisting of banking, retail, telecom and pharmacy.

8. The method according to claim 6, wherein said business scenarios are selected from the group consisting of retail banking, corporate banking, universal banking, financial marketing and wealth management.

9. The method according to claim 1, wherein:

a user can log in to any particular screen and add functionality to change a user interface screen; and a work flow incorporating the added functionality is added or stored for displaying as a prepopulated screen for new users.

10. The method according to claim 1, wherein reports include generating summary report, screen wise report and guideline wise report.

11. The method of claim 1 further comprising:

presenting the modified work flow with the addition as a use case to the next user.

12. A computer system for scenario-based conceptualization and visualization of web-based user interface, the computer system comprising:

one or more processors coupled to memory;

one or more stored indications of accessibility guidelines;

a user interface with user-selectable scenarios or web components, wherein a pre-populated screen on said user interface is modified based on user-selectable web components and the accessibility guidelines based on business requirements;

a repository for storing workflow for proposing pre-populated screen for new users; and an estimation processor for calculating an effort and generating reports based on user-selectable scenarios and the accessibility guidelines for different stages of development cycle;

wherein modifications to the pre-populated screen are stored in the repository and presented as a use case to a next user.

13. One or more non-transitory computer-readable media comprising computer-executable instructions causing a computing system to perform a method for scenario-based design and development of a web-based user interface for effort estimation, the method comprising:

receiving an indication of one or more accessibility guidelines;

providing user-selectable scenarios for said web-based user interface based on requirements;

exhibiting a work flow on a pre-populated work flow screen based on selected scenarios for said web-based user interface;

providing a plurality of user-selectable web components;

receiving an addition to the work flow of the pre-populated work flow screen;

modifying the work flow based on the user-selectable web components;

storing the work flow in a repository for proposing the pre-populated work flow screen with the addition to the work flow for new users;

via an estimation process, calculating estimated effort by an effort estimation processor based on said modified work flow of the selected user-selectable scenarios, the addition to the work flow, and the accessibility guidelines; and generating reports for each stage of development cycle.

14. The one or more non-transitory computer-readable media of claim 13 wherein:

a scenario-based user interface for receiving input is created by defining estimation parameters and domain repository setup on a create repository screen.

15. The one or more non-transitory computer-readable media of claim 14 wherein:

the estimation parameters are defined by selecting different stages for estimation and the accessibility guidelines.

16. The one or more non-transitory computer-readable media of claim 15 wherein:

the stages of estimation include requirements, design, coding, testing and deployment.

17. The one or more non-transitory computer-readable media of claim 13 wherein:

a user can log in to any particular screen and add functionality to change a user interface screen; and a work flow incorporating the added functionality is added or stored for displaying as a prepopulated screen for new users.

18. The one or more non-transitory computer-readable media of claim 13, wherein the method further comprises:

presenting the modified work flow with the addition as a use case to a next user.

* * * * *